United States Patent [19]

Muschelewicz et al.

[11] Patent Number: 5,965,226
[45] Date of Patent: Oct. 12, 1999

[54] IN-LINE METHOD FOR LAMINATING SILICONE-COATED POLYESTER FILM TO PAPER, AND LAMINATE PRODUCED THEREBY

[75] Inventors: Kenneth J. Muschelewicz, Easley; Edward J. Koinskie, Jr., Simpsonville, both of S.C.

[73] Assignee: Mitsubishi Polyester Film, LLC, Greer, S.C.

[21] Appl. No.: 08/814,560

[22] Filed: Mar. 11, 1997

[51] Int. Cl.$^6$ .............................. B32B 7/12; B32B 27/10; B32B 27/32; B32B 27/36
[52] U.S. Cl. ...................... 428/42.3; 428/42.2; 428/220; 428/336; 428/337; 428/354; 428/481; 428/483; 428/511; 428/910
[58] Field of Search ................... 428/41.8, 42.2, 428/42.3, 336, 337, 352, 354, 480, 481, 483, 511, 910, 220, 219

[56] References Cited

U.S. PATENT DOCUMENTS

| | | | |
|---|---|---|---|
| 3,057,792 | 10/1962 | Frohlich | 204/165 |
| 4,239,973 | 12/1980 | Kolbe et al. | 422/186.05 |
| 4,806,398 | 2/1989 | Martin, Jr. | 428/34.2 |
| 4,822,687 | 4/1989 | Kessel et al. | 428/447 |
| 5,244,702 | 9/1993 | Finestone et al. | 428/343 |
| 5,411,787 | 5/1995 | Kulkarni et al. | 428/195 |
| 5,424,120 | 6/1995 | Culbertson | 428/336 |
| 5,518,809 | 5/1996 | Henry et al. | 428/327 |
| 5,691,022 | 11/1997 | Knauf | 428/40.1 |

FOREIGN PATENT DOCUMENTS

| | | |
|---|---|---|
| 536 766 A2 | 9/1992 | European Pat. Off. . |
| 536 766 A3 | 9/1992 | European Pat. Off. . |
| 536 766 B1 | 9/1992 | European Pat. Off. . |
| 0 512 540 | 11/1992 | European Pat. Off. . |
| 0 588 724 | 3/1994 | European Pat. Off. . |
| 2 012 777 | 8/1979 | United Kingdom . |

OTHER PUBLICATIONS

Derwent Abstract XP–002063371 re: JP 63 037 167 A, dated Feb. 17, 1988.

*Primary Examiner*—D. S. Nakarani

[57] ABSTRACT

A multi-layered sheet product is provided which is useful as a release backing for pressure sensitive adhesive labels or as a liner for foodstuff containers and trays. The sheet product has a polymeric layer and a cellulosic layer laminated together and having an adhesive layer therebetween. A substantially uniform silicone coating is provided on a surface of the polymeric layer opposite the surface adhered to the cellulosic layer. The polymeric layer surface having the silicone coating thereon constitutes a smooth surface which, when the product is used as a release backing, minimizes distortion of the adhesive surface of an adhesive label upon separation of the label from the sheet product, an important feature for use with transparent labels. When used as a release liner for foodstuff containers and trays, the polymeric layer prevents absorption by the cellulosic layer of water from the foodstuff. Use of an oriented polyester as the polymeric layer, provides excellent tear resistance, dimensional stability and stiffness in an extremely thin laminated sheet product.

22 Claims, 1 Drawing Sheet

IN-LINE METHOD FOR LAMINATING SILICONE-COATED POLYESTER FILM TO PAPER, AND LAMINATE PRODUCED THEREBY

FIELD OF THE INVENTION

The present invention relates to a method of making multi-layered sheet products which are useful as release backings for pressure sensitive adhesive labels, and as liners for containers and trays used in the food and industrial compound industries. The present invention also relates to multi-layered sheet products produced by such methods.

BACKGROUND OF THE INVENTION

Pressure sensitive adhesive labels are generally provided with a releasable backing known as a backing layer, release layer or release liner. The backing protects the adhesive surface of the label from contamination by dust, debris, moisture and other contaminants until the label is ready for use. It is important that the backing is easily releasable from the label so that the label does not tear when separated from the backing. Easy release is also needed so that the adhesive layer of the label remains intact during separation, enabling maximum adhesion of the label when applied to a subsequent surface.

Silicone coatings on paper products are well known as suitable materials for release liners, release backings and other low surface energy surfaces. Unfortunately, such materials are not suitable as moisture and water barrier materials, and are relatively expensive due to the thickness required for such materials to be commercially durable. Furthermore, silicone-coated paper products have a rough topography due to the fibrous and porous nature of the paper. The topography of the paper tends to be transferred to and adversely affects the smoothness of the label adhered to it. This is particularly troublesome when paper release backings are used for transparent labels having adhesive layers which tend to pick up the topography of the backing. When the rough topography of the backing is transferred to the adhesive layer of a transparent label, clarity of the adhesive layer and thus the label is diminished. A need therefor exists for an extremely smooth backing material which will not cause the transfer of a rough topography to the adhesive layer of a transparent label.

Other problems with the use of silicone-coated paper backing and liner materials is the tendency of such materials to rip or tear during a diecutting operation. A need exists for a backing and liner material which can be neatly cut by a diecutting press so as to achieve a finished form having smooth edges.

Release-coated surfaces are also desirable for containers, trays and support sheets which contact foodstuffs, and for drums, tubes and containers for tacky or sticky industrial compounds. Complete release of foodstuffs and industrial compounds from such surfaces is essential to minimizing waste of such products. Complete release of foodstuffs from container surfaces also preserves the appearance of the foodstuff and thus provides an aesthetically pleasing presentation of the product. For example, it would be desirable to provide a release-coated surface on a pizza box or pizza tray insert so that melted cheese overflowing from a slice of pizza will not stick to the box or tray. When melted cheese from a slice of pizza flows onto the surface of existing cardboard pizza boxes, the cheese sticks to the box and pulls more toppings off the slice as it is lifted from the box. A need therefore exists for food containers, support sheets and trays provided with release coatings which prevent sticking of foodstuffs to the surfaces thereof.

Likewise, a need exists for an industrial composition or compound container such as a drum or tube having a release coating thereon which prevents sticky or tacky industrial compounds from sticking to the container.

Coated paper liners are also known for food containers and industrial compound containers, and are desirable in that they offer good printability and stiffness. Unfortunately, coated paper liners require sufficient thickness to provide satisfactory tear resistance and they suffer from the undesirable properties of moisture scavenging and curling. Moisture scavenging results in the absorption of water content from foodstuffs and industrial compounds in contact with the liner, thereby adversely affecting the quality of the contained foodstuff or industrial compound and the structural stability of the container.

Certain polymeric compositions provide good moisture barrier properties and tear resistance, but offer poor printability and stiffness. Polymeric liners may also be dimensionally unstable for many applications. U.S. Pat. No. 5,244,702 discloses a paper-plastic laminate sheeting which can be used for manufacturing grocery bags and envelopes. The patent does not suggest, however, that the laminate could be used as a release backing. The plastic layer may comprise a film of polypropylene, polyethylene, nylon or polyester. To avoid diminishing the reinforcing characteristics of the film, the patent teaches using a water-based adhesive, and not a hot melt adhesive, for laminating the film to a paper layer. To render the inner surface of the film more receptive to the water-based adhesive, the patent teaches first subjecting the film surface to an ionizing treatment to increase the surface energy of the film surface.

It has been found that ionization treatments, unless conducted at extremely low power, can deleteriously affect and even destroy silicone coatings on a thin polymeric film. Destruction of silicone coatings on thin polymeric films may occur even when the opposite surface of the film is the only surface exposed to the ionization treatment.

The present invention provides a backing and liner material having a silicone release surface. The multi-layered products of the present invention exhibit excellent release, printability, stiffness, tear resistance, and dimensional stability together with moisture barrier properties. The present invention provides a method of producing such backing and liner materials in a thin structure and at a continuous high production rate without deleteriously affecting the silicone release surface. The printability and stiffness of a coated paper release structure and the tear resistance and moisture barrier properties of a polymeric liner are achieved while avoiding curling problems and swelling due to absorption of water into a paper layer.

The highly smooth silicone-coated polymeric surface eliminates problematic transfer of a rough topography to label adhesives. The present backing and liner materials may be substantially thinner, e.g., thinner than about 60% as thick, yet at least as strong as silicone-coated paper materials. In addition, the materials of the present invention possess a smooth surface for diecutting which leads to precise cutting of forms with a minimal risk of material ripping or tearing.

SUMMARY OF THE INVENTION

In accordance with the present invention, a backing and liner material is provided which comprises a polymeric material layer having a substantially uniform silicone coating formed on one side thereof, an adhesive layer, and a cellulosic material layer, wherein the adhesive layer is disposed between the polymeric material layer and the cellulosic material layer to adhere them together. The resultant structure can be extremely thin, e.g., thinner than about 60% the thickness of comparable silicone-coated paper release materials, yet offer excellent release properties and durability. The preferred polymeric material for the polymeric layer is an oriented polyester material, particularly oriented polyethylene terephthalate. The surface of the polymeric layer having the silicone coating thereon is extremely smooth and provides a release surface of very low surface energy. As a result of its highly smooth surface, the structure of the invention is ideal for a transparent adhesive label backing because the smooth surface minimizes distortion of the pressure sensitive adhesive layer on the label when the label is separated from the backing. As a result, there is no transfer of rough topography from the backing to the label adhesive layer because the topography of the backing material is extremely smooth. The low degree of distortion enables the adhesive layer of the label to have excellent clarity, a particularly advantageous feature for transparent labels.

The multi-layered structure of the present materials combines all the advantages of coated paper backings and polymeric liners, and provides such advantages in a thin structure which can be thinner than about 60% the thickness of silicone-coated paper backing materials. The structures of the invention exhibit excellent release, printability, stiffness, tear resistance, and dimensional stability together with moisture barrier properties.

In addition, the methods of the present invention enable fast production rates on a continuous, in-line basis. The silicone-coated polymeric material layer is continuously adhered to the paper layer without substantially disrupting or destroying the silicone coating or deleteriously curling or swelling the paper layer. In preferred embodiments, a hot melt adhesive is continuously applied to the polymeric material to provide an adhesive layer, and then the paper layer is laminated to the polymer layer in the nip of counterrotating rollers. At least one of the rollers is preferably a chilling roll which solidifies the adhesive and keeps the paper and the silicone-coated polymeric layer sufficiently cool so as to avoid substantial distortion or destruction thereof. In embodiments of the invention, the polymeric material is subjected to low levels of corona discharge to facilitate bonding of the adhesive to the polymer without substantially adversely affecting the release properties of the silicone coating.

In preferred embodiments of the invention, a multi-layered structure is provided comprising an oriented polyethylene terephthalate polymeric layer having an outer surface coated with a polymerized silicone composition and adhered to a paper layer by a polyolefinic hot melt adhesive. Some preferred structures according to the invention may have a polymeric layer thickness ranging from about 0.25 to about 1.5 mils, laminated to a paper layer comprising tissue paper or kraft paper having a thickness of up to about 12 point paper stock, depending upon the desired application of the product. Thicker polymeric and cellulosic layers are also within the realm of the present invention.

The present invention provides an adhesive label in combination with a releasable backing, and more particularly provides transparent pressure sensitive adhesive labels. In addition, the present invention provides containers, trays and supports with release liners therefor which come in contact with foodstuffs or tacky industrial compositions such as resins.

BRIEF DESCRIPTION OF THE DRAWING

The drawing FIGURE shows an exemplary laminating process in accordance with an embodiment of the present invention, and a device for carrying out the inventive process and forming a laminated structure according to the invention.

DETAILED DESCRIPTION OF THE INVENTION

Figure 1:
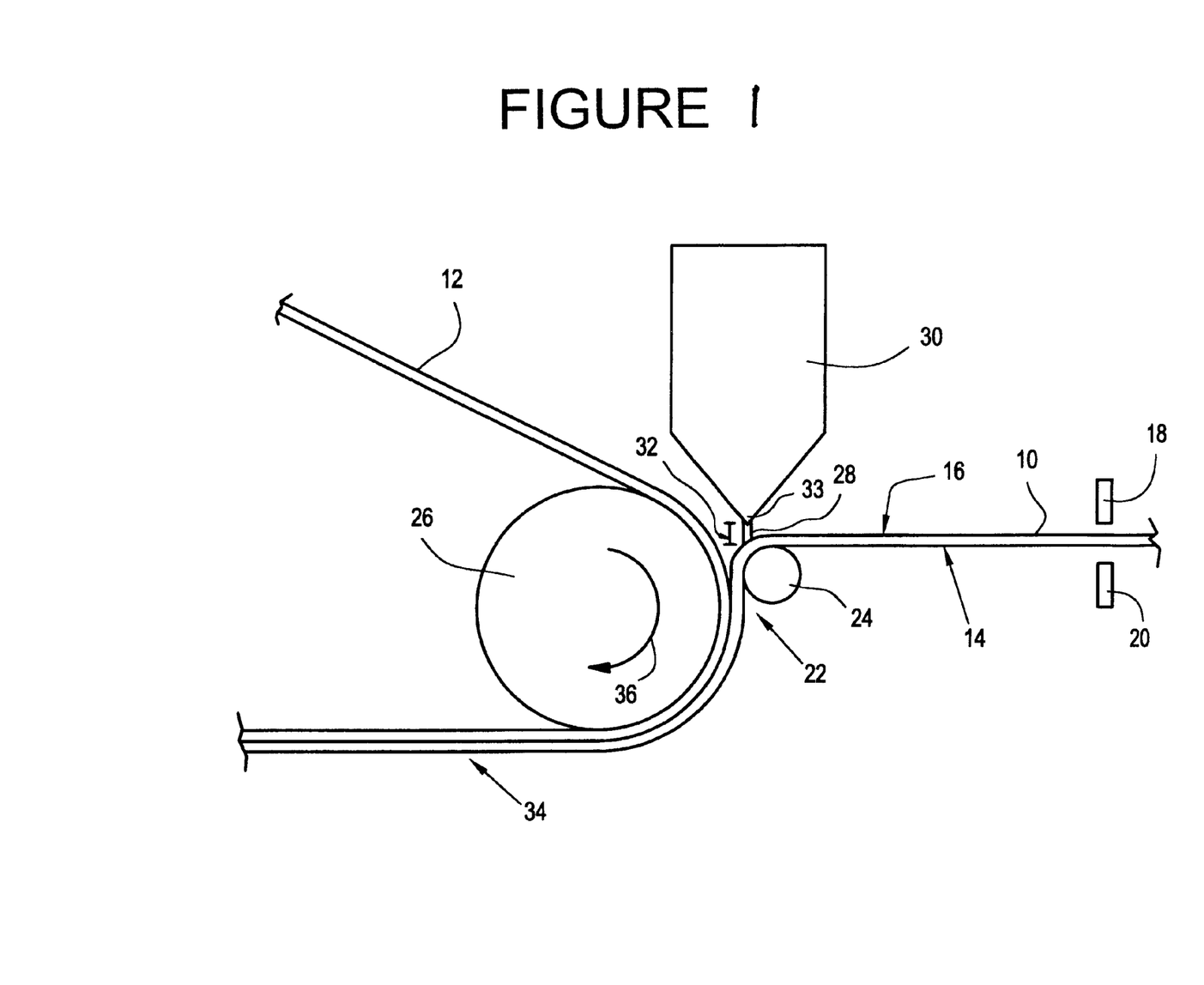

The present invention provides multi-layered sheet and web materials comprising a silicone-coated polymeric layer adhesively laminated to a cellulosic layer. In addition, the invention provides a method of manufacturing such materials at high speed using conventional laminating equipment. The materials of the invention may be used as a release backing for adhesive labels or as a liner for containers, trays and support surfaces for foodstuffs and industrial compositions or compounds. The materials are particularly well suited for use as release backings for transparent pressure sensitive adhesive labels and as liners for containers or surfaces which contact sticky or tacky foodstuffs or industrial compositions or compounds. In embodiments of the invention, the thickness of silicone-coated paper products may be reduced by at least about 40% without loss of strength by laminating a thinner layer of paper to a silicone-coated thin polymer layer. For example, a 2.5 mil thick silicone paper backing may be replaced by a laminated structure according to the invention having a thickness of about 1.5 mils or less.

The structure of the present invention provides a release backing for an adhesive label wherein the silicone-coated surface of the polymeric layer is sufficiently smooth to minimize surface distortion of the label adhesive as the label is separated from the silicone coating. The need for such a smooth surface is particularly important when the label is substantially transparent. If the silicone-coated surface of the polymeric layer is not smooth, the adhesive layer of the label tends to become surface distorted when the label is peeled from the release backing, adversely affecting the clarity of the adhesive label. Distortion of the label adhesive is especially disadvantageous when the label is substantially or fully transparent. Furthermore, the adhesive layer of the label tends to map or pick-up the surface contour or topography of the backing, which can also adversely affect clarity of a transparent label and the smoothness of the label when the silicone-coated release surface of the backing is not sufficiently smooth.

The multi-layered sheet materials of the present invention may be produced by: (a) providing a polymeric material layer having a first surface and an opposite second surface, (b) forming a substantially uniform and smooth silicone coating on the first surface, (c) providing a cellulosic material layer adjacent the polymeric material layer, (d) providing an adhesive layer between the second surface and the cellulosic material layer, and (e) causing the second surface and the cellulosic material layer to contact and adhere to one another via the adhesive layer therebetween to form a multi-layered product. In embodiments of the invention, the silicone coating may be applied and then the silicone-coated polymer may be laminated to the paper all in-line, without rolling up the polymeric layer. In other embodiments, prefabricated silicone-coated films may be employed. The prefabricated silicone-coated polymeric film may be supplied in rolled-up form and then unrolled prior to lamination to the cellulosic layer.

The polymeric layer of the present invention can be manufactured from various polyester resins. Polyethylene terephthalate, polytetramethylene terephthalate, polyethylene 2,6-naphthalate, and polyethylene-1,4-cyclohexylene dimethylene terephthalate are examples of homopolymers which may be employed in the practice of the present invention. Polyester copolymers may also be used. Possible copolyesters include polyethylene terephthalate/isophthalate, polyethylene terephthalate/adipate, polyethylene terephthalate/sebacate, and polyethylene terephthalate/sulphoisophthalate. Polyethylene terephthalate homopolyester is preferred.

Polyester films are preferred for the polymeric material layers of the invention because of their smoothness, strength, tear resistance and moisture barrier characteristics. According to a preferred embodiment of the invention, polyethylene terephthalate (PET) is a preferred film material, particular oriented PET which has been stretched uniaxially or biaxially.

If polyester is used as the polymeric layer, the polyester film may also include other polymers but preferably the film has a polyester content greater than about 85% by weight. For example, a blend of polyester and polyolefin, such as polyethylene terephthalate/polyethylene, or a blend of polyester and polyamide, such as polyethylene terephthalate and nylon may be employed.

The silicone coating on the polymeric layer provides a low surface energy surface which enables the laminated materials of the invention to be well-suited for release backing and release liner applications. While many methods are provided for forming a low surface energy silicone coating on a polymeric layer, preferred methods for preparing silicone-coated polyesters are described in commonly assigned U.S. patent application Ser. No. 07/773,323, filed Oct. 11, 1991, now abandoned, U.S. application Ser. No. 08/476,001, filed Jun. 7, 1995, and U.S. application Ser. No. 08/601,587, filed Feb. 14, 1996, now U.S. Pat. No. 5,728,339, and European Patent no. 536,766, granted Sep. 11, 1996, all in the name of Grover L. Farrar for "In-Line Silicone-coated Polyester Film And A Process For Coating The Film," the entireties of which are herein incorporated by reference.

As a preferred polymer, the manufacture of a silicone-coated oriented polyester film for the polymeric layer will be described. It is to be understood that similar processes can be used to make coated polymeric layers comprising different polymers.

The polyester film of the present invention can be manufactured by an extrusion process. Polyester resin is first heated to a molten state and then extruded through a wide slot die in the form of an amorphous sheet. The sheet-like extrudate is rapidly cooled or quenched to form a cast sheet of polyester by extruding the amorphous sheet around a polished, revolving chilled casting drum. The cast polyester sheet can then be stretched in one or more directions, while being heated to a temperature in the range of from about 80° C. to about 160° C., preferably from about 90° C. to about 100° C. The degree of stretching may range from about three to five times the original cast sheet unit dimension. Preferably, the polyester film is biaxially oriented (stretched in both the machine direction and the transverse direction) rather than uniaxially oriented.

Prior to coating the polyester film surface with the silicone coating, the film may be surface-treated in a conventional manner by exposure to an electric corona discharge. Electric corona discharge is a conventional surface treatment which is commonly performed on polyester films to enhance the film's wetting property. Electric corona discharge methods and apparatus are described in U.S. Pat. Nos. 3,057,792 and 4,239,973. In embodiments of the invention, power levels which may be used prior to coating the polyester film with silicone may range up to about 5 watts per square foot per minute, for example from about 1.5 to about 4 watts per square foot per minute.

For uniaxially oriented film, the corona treatment followed by the silicone coating application may occur during the in-line manufacturing process, either before stretch orientation or after stretch orientation. If the corona treatment followed by the coating occurs before stretch orientation, heating the film before stretch orientation will usually drive off the water in the coating. If the corona treatment and coating for a uniaxially oriented film occurs after a machine direction stretch during an in-line manufacturing process, the film should be completely dried before winding the film. Heat-setting the film to lock-in the physical properties is generally sufficient to dry the film before winding. For uniaxially oriented film, the preferred procedure is to corona treat and coat the film before stretch orientation.

For biaxially oriented film, the corona treatment followed by the coating may occur during the in-line manufacturing process either before stretch orientation, between the machine draw and the transverse draw, or after biaxial orientation. Again, if the corona treatment and coating step occur after stretch orientation is complete, it is preferred that the film be completely dry before winding. Moreover, the biaxially oriented film should be heat-set to lock-in the physical properties of the film, and heat-setting is generally sufficient to dry the film before winding. If the corona treatment or coating occurs before orientation, or between draws during orientation, the latter orientation steps are generally sufficient to drive off the water from the coating. Preferably, for biaxially oriented film, the corona treatment and subsequent coating occur between draws during the stretch orientation stage.

The polymeric layer, preferably a polyester sheet, is coated on the electric corona discharge treated surface with a silicone coating. The coating composition may conveniently be applied as an aqueous emulsion using any of the well known coating techniques. For example, the film may be coated by roller coating, spray coating, gravure coating, reverse gravure coating, or slot coating. The heat applied to the film during the subsequent preheating, stretching and heat-setting stages is generally sufficient to evaporate the water and cure and bind the coating to the polyester film.

The oriented polyester film, whether uniaxially oriented or biaxially oriented, is generally heat-set at a temperature ranging from about 190° C. to about 240° C., preferably from about 215° C. to about 235° C. The coated oriented polyester film is then wound into a roll for further processing or shipping.

The silicone coating is generally prepared by hydrolyzing a glycidoxy silane in deionized water and blending with an aqueous silicone resin emulsion and its corresponding crosslinker. Generally, the aqueous silicone resin compositions are platinum catalyzed. However, condensation type siloxanes may be employed and the emulsion may be catalyzed with a tin catalyst. The crosslinker employed should be that recommended by the particular silicone resin composition manufacturer for that specific aqueous silicone resin composition.

Examples of aqueous based silicone resin compositions which may be employed are:

1) Dow Corning (Midland, Mich.) Syl-off X2-7720, or 7900, or 7910, aqueous silicone resin composition comprising methyl vinyl polysiloxane and methyl hydrogen polysiloxane with either the X2-7721 or 7922 crosslinking system comprising platinum polysiloxane;

2) G. E. Silicones (Schenectady, N.Y.) SM3200 aqueous silicon resin composition comprising methyl vinyl polysiloxane and methyl hydrogen polysiloxane with the 3010 crosslinking system comprising platinum polysiloxane.

3) Wacker Silicone (Adrian, Mich.) aqueous based 410E silicone resin composition comprising methyl vinyl polysiloxane and platinum with the V20 crosslinking system comprising methyl hydrogen polysiloxane;

4) PCL (Rhone-Poulenc Inc., Rock Hill, S.C.) PC-105 aqueous based silicone resin composition comprising methyl vinyl polysiloxane and methyl hydrogen polysiloxane with the catalyst component of PC-95 comprising platinum polysiloxane;

5) PCL PC-107 (Rhone-Poulenc Inc.) aqueous based silicone resin composition (similar to PC 105) with the above-identified PC-95 crosslinker; and 6) PCL PC-188 (Rhone-Poulenc Inc.) aqueous based silicone resin composition (similar to PC 105) with the above-identified PC-95 crosslinker.

The amount of deionized water blended with the aqueous silicone resin composition is dependent upon the coating method and desired amount of solids, by weight, to be coated on the polyester film.

The glycidoxy silane may be a glycidoxypropyltrimethoxysilane or generally any glycidoxysilane represented by the formula X—Y—Si—R1, R2, R3, wherein X is a glycidoxy group, Y is an alkylene group, such as methylene, ethylene, propylene, etc., and R1, R2, and R3 are hydrolyzable groups, such as methoxy, ethoxy, acetoxy, and the like. These silanes possess water solubility or water dispersibility.

The solids level of the coating may be from about 3% to about 30% by weight solids. Preferably, the percent solids, by weight, is from about 5% to about 15%. While it may be possible that a solids concentration below 3% by weight for the coating may be effective, it is believed that such a level would be minimally effective. Additionally, while a solids level greater than 30% by weight may be effective, it is believed that at such a level, a haze may result in the film, or the coating is more expensive but no more effective than a film having a solids level in the preferred range, for example.

As previously mentioned, the coating comprises the aqueous thermosetting silicone resin composition, including any necessary crosslinkers, etc., and the glycidoxy silane. The minimum amount of glycidoxy silane believed to be effective for an aqueous silicone resin composition in the present invention is about 1.0% by weight of the silicone solids. At the preferred coating solids level of about 5% to about 15% by weight, the glycidoxy silane concentration in solution is from about 0.5% to about 1.5%, by weight. On a dry weight basis, the glycidoxy silane is preferably from about 3% to about 30% of the silicone solids. Using much more than about 30% by weight of the glycidoxy silane on a dry weight basis is expensive and may not yield proportionally better results.

The coating weight of the coating may be from about 0.02 lb./ream to about 0.10 lb./ream. Coating thicknesses of from about 750 angstroms to about 1500 angstroms are preferred. Generally, a thickness less than the above amount is not effective as a release coating, while a thickness more than the above amount is not cost effective.

The thickness of the polymeric layer depends upon the desired application of the finished multi-layered product. When used as a release backing for an adhesive label, it is preferred that the polymeric layer, which includes the silicone coating, has a thickness of from about 0.25 mil to about 1.5 mils, with thicknesses in the range of from about 0.5 mil to about 1.0 mils being more preferred for some applications. When used as a liner for containers and surfaces which contact foodstuffs or industrial compounds, slightly thicker polymeric layer thicknesses may be preferred, depending upon many factors including the thickness of the cellulosic layer, the desired flexibility of the product, and the weight and form of the foodstuff or compound which will contact the liner. For example, a liner for a 55 gallon drum of granular-containing industrial resin would generally require a thicker polymeric layer thickness than a liner for a one pint box of light syrup.

The surface of the polymeric layer opposite the silicone-coated surface, herein referred to as the bottom surface, is adhered to the cellulosic material layer by a laminating adhesive. To increase the adhesion of the polymeric layer to the adhesive, and thus to the cellulosic layer, the laminating surface of the polymeric layer may be surface treated when certain laminating adhesives are used. Chemical treatments, flame treatments, corona discharge treatments, and combinations of such treatments may be used to prepare the laminating surface. However, the surface treatments should not deleteriously affect the silicone coating on the opposite surface of the polymeric layer.

For example, corona treatment may be appropriate to improve wet-out of a water-based adhesive on the polymeric layer laminating surface. A preferred surface treatment is a corona discharge treatment of the laminating surface at a power and rate which are sufficiently low so as to avoid substantial adverse affects upon the releaseability of the silicone coating on the opposite side of the polymer layer. Exemplary low power corona discharge treatments which may be employed are treatments of less than 0.5 watt per square foot per minute, preferably about 0.2 watt per square foot per minute, or less, and most preferably about 0.1 watt per square foot, or less. Even at such low power, such as 0.1 watt per square foot, corona treatment provides a treated surface with improved wet-out and bondability characteristics which are particularly important when a water-based adhesive is used for laminating. Higher power surface treatments are generally avoided as they may undesirably affect the smoothness and release characteristics of the opposite silicone-coated surface, even if applied only to the film surface opposite the silicone-coated surface. It has been found that corona treatments of the bottom surface of a 142 gauge silicone-coated PET film with as little power as 0.5 watt per square foot per minute may substantially destroy the silicone coating on the opposite surface of the film. Thicker polymeric layer thicknesses offer more protection to the silicone coating and can thus be treated with higher power corona treatments. Preferably, if a corona treatment of the polymeric layer is employed, the treatment is of a power and rate which improves wet-out characteristics of the laminating film surface without substantially adversely affecting the opposite silicone-coated surface of the layer.

When hot melt resin adhesives are employed, it has been found that no corona treatment of the film surface is necessary as adhesive wet-out and bondability to the polymeric layer is generally excellent even without corona treatment.

When the polymeric layer is provided as a web or film of already silicone-coated polymeric material, and the laminating surface is to be corona treated, it is preferred to corona discharge treat the laminating surface of the layer after it is unrolled from the web. If surface treated prior to being rolled up, the treated laminating surface may stick to the silicone-coated top surface it is rolled onto and thus cause an undesired transfer of the silicone coating to the bottom surface.

The cellulosic material layer preferably comprises a paper material. In embodiments of the invention, the cellulosic material may be a tissue paper layer, a kraft paper layer, a paper board stock including paper boards of up to and exceeding 12 point board stock, fiberboard drum sidewall material layers, and rayon material layers. In addition, the cellulosic material may comprise a cardboard material, corrugated cardboard, or other sheet-like pulpous or fibrous materials, including cotton-containing sheets and the like. Herein the term "cellulosic material" includes cotton-containing sheet-like structures, and the terms "sheet" and "sheet-like" describe both rectangular single pieces of cellulosic material and webs of such materials. Preferably, the surface of the cellulosic material layer is left untreated, or treated to increase adhesion of the layer to the laminating adhesive.

The laminating adhesive preferably comprises at least one adhesive selected from hot melt adhesives such as extruded polyolefins, solvent adhesives, emulsion adhesives, and wet lamination adhesives. The adhesive composition is primarily chosen to be compatible with the plastic film, as the paper layer is generally amenable to adhesion by various types of adhesive compositions. According to a preferred method and structure of the invention, the laminating adhesive is an extruded hot-melt polyolefin, more preferably an extruded low density polyethylene (LDPE). According to one preferred embodiment of the invention, a low density polyethylene is melted at a temperature of between about 585° and about 610° F. and extruded to laminate a silicone-coated PET layer to kraft paper.

The amount of laminating adhesive used should be just sufficient to weld the polymeric and cellulosic layers together, without significantly increasing the thickness of the overall structure. Laydown amounts of LDPE laminating adhesive in the range of from about 7 to about 14 pounds per 3000 square foot ream are preferred. The hot melt adhesive is preferably extruded between the polymeric and cellulosic layers adjacent a compression nip which laminates the layers together. When wet lamination adhesives are used, particularly water-based adhesives, it is preferable to laydown the adhesive immediately adjacent a compression nip or first on the polymeric layer. Otherwise, liquid or water from such adhesives may undesirably absorb into the cellulosic layer. Generally, the adhesive is applied to provide a continuous layer of adhesive so as to avoid adverse affects upon the topography of labels. However, in other embodiments of the invention, the adhesive may be applied intermittently or spotwise between the polymer layer and cellulosic layer. For example, in the production of trays or pizza boxes, a continuous adhesive layer may not be required.

The adhesive may be applied to the film well before the film reaches the compression nip, but applying the adhesive at a substantial distance from the compression nip is avoided when a hot melt is used to prevent premature cooling of the adhesive prior to lamination. Water-based and solvent-based adhesives are preferably applied to the polymeric film and not to the paper layer, to minimize absorption of water or solvent into the paper layer and thus to minimize curling and swelling of the laminated product. If a water-based or solvent-based adhesive is used, it can applied to the film a substantial distance from the compression nip so long as the adhesive adequately wets out on the film and the wet-out characteristics are not deleteriously affected during the time it takes for the adhesive-coated film to reach the laminating compression nip.

Preferably, the adhesive is applied just prior to the film entering the nip. In a preferred embodiment, the adhesive is applied to the film as the film passes around a compression roller which forms the laminating compression nip. While the application of a continuous layer of hot melt adhesive is preferred, e.g., a polyethylene hot melt, the adhesive may also be applied in a continuous or discontinuous layer by spraying, brushcoating, or rolling. An offset gravure system can be used to apply a uniform pattern of adhesive dots to the film. Alternatively, the adhesive may be applied to the paper prior to the paper entering the laminating compression nip.

Drying conditions for the laminating adhesive should be selected to minimize curling of the finished product. Exemplary drying temperatures may range from about 225° F. to about 300° F. for drying a water-based adhesive. When a water-based or a solvent-based adhesive is used, the adhesive is preferably applied immediately before laminating, and drying occurs immediately after laminating. When hot-melt adhesives are used for laminating, the adhesives are preferably chilled immediately after lamination to minimize or prevent heat distortion of the polymeric layer and silicone coating due to the high temperature of the hot-melt adhesive.

According to a preferred embodiment of the invention, one of the two laminating rollers is chilled to prevent excessive softening of the plastic film or disruption or distortion of the silicone coating. A chilled roller is particularly preferred when the hot melt adhesive is applied at a temperature which approaches or exceeds the softening temperature, or glass transition temperature (Tg), of the film material. The melting point of the hot melt adhesive is preferably below the glass transition temperature of the polymeric layer so as to avoid substantial distortion or softening of the polymeric layer. Chilling roll temperatures may range, for example, from about 50° F. to about 85° F.

A preferred adhesive for use with a polyethylene terephthalate film is a molten composition consisting essentially of low density polyethylene. Pigments and other additives may be added to the adhesive composition if desired, but hot melt adhesives have been found to yield a high strength bond without the use of water or a solvent. The absence of water or solvent when a hot melt adhesive is employed, results in little or no absorption of the adhesive or adhesive carrier into the paper layer and no swelling or curling problems with the resultant product. A molten resin adhesive can be extruded across the width of the film and/or paper as they enter, or preferably just prior to entering, the compression nip between the laminating rollers.

In practice, the laminating system may be driven by a motor to operate at a speed of between about 150 and about 500 feet per minute, or even at a greater rate. The operating speed is limited by the strength of the paper web. For a relatively thin paper of low strength, the speed must not be such as to rupture the paper web. Hence, while the oriented film can tolerate high speeds, the speed cannot exceed that which can be tolerated by the paper web.

The products of the present invention, made in accordance with the methods set forth above, include release backings and liners for containers and surfaces which contact sticky or tacky foodstuffs or industrial compositions or compounds. In addition, the present invention also provides labels, containers, and surfaces which include a release backing or liner. According to an embodiment of the invention, a combination label and release backing is provided wherein the label has an adhesive surface on one side thereof in contact with the backing. The adhesive surface on the label may be a conventional pressure sensitive adhesive. The backing comprises a polymeric material layer which includes a first surface having a substantially uniform, smooth silicone coating formed thereon. The backing also comprises an adhesive layer and a cellulosic material layer, wherein the adhesive layer is disposed between the polymeric material layer and the cellulosic material layer to adhere them together. The smooth silicone coating of the polymeric layer contacts the adhesive surface of said label.

According to another embodiment of the invention, a label and backing combination is provided as described above wherein the label is substantially transparent. In more preferred embodiments, the combination includes a silicone-coated oriented PET layer as the polymeric layer, and/or the cellulosic layer comprises a thin kraft paper.

According to yet another embodiment of the invention, a combination container or surface having a release liner thereon is provided. The container or surface is particularly well-suited for applications where the liner comes in contact with sticky or tacky foodstuffs or industrial compounds or compositions such as resins. The release liner used in such a combination may be identical to the label release backings of the invention described above, but may alternatively have a greater thickness of one or more of the layers. Also, the release surface of such liners does not need to be as smooth as the surface of a release backing for a transparent label, but should nonetheless be smooth enough to prevent any substantial sticking of a foodstuff or industrial compound thereto. The use of such release liners minimizes waste of foodstuffs or industrial compounds which come in contact therewith, and are particularly well-suited for use as fiber drum liners and as pizza boxes or pizza box liners or tray inserts.

According to yet another embodiment of the invention, the cellulosic material layer to be laminated comprises a fiberboard drum sidewall material which is used to make fiberboard drums. Although a release liner according to the invention can be inserted into a fiberboard, the drum itself may be made by forming a laminated structure according to the invention, e.g., rolling the structure into a drum. The resultant fiberboard drum has a release liner surface provided by the silicone-coated polymeric layer which had been previously laminated to the fiberboard material. Much thicker cellulosic layers are used according to this embodiment of the invention and include cellulosic layers having thicknesses of from about 10 to about 1000 mils, with thicknesses of between about 100 and about 500 mils being more preferred for many fiberboard drum applications.

Referring to the FIGURE, a side view of an exemplary device and process are depicted for carrying out a preferred embodiment of the invention and for forming a laminated structure according to the invention. According to the embodiment shown, a polymeric layer in the form of a film, sheet, or web 10 is laminated to a cellulosic layer supplied in the form of a sheet or web 12. For testing purposes, web widths of about 30 inches may be used at run speeds of up to about 600 feet per minute. On full-size manufacturing lines, webs having standard widths of about 80 inches or 120 inches may be employed and run at line speeds of about 1000 or 2000 feet per minute, respectively. For the purpose of clarity, the relative thicknesses of layers 10 and 12 shown in the FIGURE have been greatly exaggerated.

The polymeric layer 10 may be fed from a supply (not shown) such as a roll, or preferably produced by in-line silicone coating of a freshly drawn polymeric film. The polymeric layer 10 has a release surface 14 comprising a silicone coating prepared by hydrolyzing a glycidoxy silane in deionized water and blending with an aqueous silicone resin emulsion and its corresponding crosslinker. Opposite the surface of the polymeric layer having the silicone coating 14 thereon, the polymeric layer has a laminating surface 16, which may be treated by a corona discharge device 18 prior to lamination. Commonly available and many existing laminating systems have a corona treatment device 20 for treating the film surface opposite the laminating surface. The device 20 may be turned off to avoid destruction of the silicone coating 14. When water-based laminating adhesives are used, corona discharge treatments may be used to improve wet-out characteristics of the adhesive onto the polymeric laminating surface, so long as the treatment does not substantially destroy the silicone coating opposite the laminating surface.

The polymeric layer 10 and the cellulosic layer 12 may be fed to a laminating compression nip 22 formed by two compression rollers 24 and 26. Compression roller 26 is provided with cooling means such that the roller is a chill roller in addition to being a compression roller. As the polymeric layer 10 passes around compression roller 24, but before it reaches the compression nip 22, a hot melt adhesive 28 is applied to the surface of the polymeric layer from an adhesive applicator die 30. An air gap 32 is provided between the distal tip 33 of the adhesive die nozzle and the laminating surface 16 of the polymeric layer where the adhesive first contacts the laminating surface.

As the polymeric layer and cellulosic layer with the adhesive therebetween pass through the compression nip 22, the layers are adhered and laminated to each other to form a laminated structure 34. At the point of lamination and/or immediately thereafter, structure 34 is passed around chill roller 26 to cool the hot melt adhesive 28 and minimize or prevent heat distortion of the silicone-coated polymeric layer 10. Chill roll placement "immediately" after the compression nip includes locations adjacent but spaced from the nip, for example, with one or more separate chill rolls. However, the path length of the multi-layered structure should not be too long as to allow heat distortion of the polymeric layer by the hot adhesive prior to being chilled. Preferably, the chill roll is maintained at ambient temperature or at about 72° F. The clockwise direction of rotation of the roller 26 is shown by arrow 36. Roller 24 rotates in an opposite counterclockwise direction.

When hot melt adhesives are used having melting ranges which are lower than the Tg of the polymeric film, immediate chilling of the laminated structure may not be needed.

An uptake roll (not shown) for the laminated structure 34 is provided, the rotational speed of which dictates the laminating speed and the speed of supply of the two layers. The adhesive applicator die may be controlled based on the desired coating weight and the lamination speed. The die is controlled to apply an appropriate adhesive amount of adhesive for laminating and bonding.

The present invention is further illustrated by the following non-limiting examples wherein all parts, percentages and ratios are by weight, and all temperatures are in °F. unless otherwise indicated:

EXAMPLES 1 AND 2, CONTROLS 1–4, AND COMPARISON 1

Experiments were conducted to determine the force required to release labels and tapes from the silicone-coated surfaces of various non-laminated controls, inventive laminates, and a comparison laminate. Process conditions for each sample were varied to analyze the effects of the various conditions on releasability.

Each of Controls 1–4, Examples 1 and 2, and Comparison 1, was processed on a 30 inch wide pilot line wherein the respective silicone-coated PET film roll is unwound and subjected to a set of processing conditions. The conditions which were varied included line speed, minimum path length, corona treatment, pre-heating, laminate paper weight, and idler roller lock-up.

For each control, example and comparison, the silicone-coated PET film was supplied as a pre-manufactured roll. The rolled film was formed by an in-line process wherein the PET film had been drawn, uniaxially stretched in the machine direction to about 3.7 times its pre-stretched length, coated with a glycidoxy silane silicone coating composition, and then stretched in the transverse direction to about 3.7 times its pre-stretched width. The PET films used in Controls 1–4, Examples 1 and 2, and Comparison 1 each had a silicone coating thickness of from about 750 angstroms to about 1500 angstroms.

For inventive Examples 1 and 2, and Comparison 1, the silicone-coated PET film was laminated in-line to a bleach Kraft paper by an apparatus and method as shown in the drawing FIGURE. Lamination involved extruding a hot melt resin adhesive comprising a low density polyethylene available as NOVAPOL LC-0717-A, from Novapol LD division of Novacor Chemicals, Inc., Calgary, Alberta, Canada. NOVAPOL LC-0717-A has a melt index of about 7.5 and a density of about 0.917 g/cc.

In Example 2 shown in Tables I and II below, a 40 pound per ream natural Kraft paper was used as the cellulosic layer and the PET film was supplied from a secondary unwind position. The paper was supplied as a roll from the primary unwind position such that the minimum path length of the paper was about 15 feet less than the minimum path length of the PET film. In each of Example 1 and Comparison 1, the paper roll occupied the secondary unwind position while the PET film roll occupied the primary unwind position.

Controls 1–4 were non-laminated silicone-coated polyethylene terephthalate films processed according to the conditions shown in Tables I and II below. The silicone-coated PET film of Control 1 was fed through the testing apparatus at a line speed of 500 feet per minute. After line feeding was complete, the release surface of the film was tested to obtain a base line release force reading.

During the travel of Control 2 through the apparatus, the surface of the PET film opposite the silicone-coated surface was corona discharge treated at a rate of 0.5 watt per square foot per minute. The PET film of Comparison 1 was subjected to the same corona treatment as the PET film of Control 2, but in Comparison 1, the PET film was subsequently laminated to a bleached Kraft paper having a weight of 40 pounds per ream. For Comparison 1, the corona treated surface was the laminating surface.

Control 3 in Tables I and II was passed through a 275° F. primer heater zone at a rate of 20 feet per minute to heat and soften the film. A line speed of 20 feet per minute was used to ensure thorough heating of the film.

The feed path for the Control 4 sample led the film around an intentionally locked-up idler roller such that the silicone-coated surface of the PET film rubbed on the roller. In this respect, Control 4 mimics conditions in a full production paper mill. If the present invention is adapted to such a system, the silicone-coated surface may pass over locked idlers which may have an affect on release from the coated surface.

The release forces shown in Tables I and II were determined using adhesive labels or tapes made by applying an acrylic-based adhesive to the release surface of the silicone-coated PET film and thereafter applying paper strips, 2 inches wide by 12 inches long, as label material which picks up the adhesive. The force required to pull the paper strip from the release surface was measured using a TLMI release tester operating at a high-speed pull rate of 400 inches per minute. Such high-speed release conditions approximate labeling conditions in a mass production assembly line facility. The results shown are forces per two-inch width. The release forces shown in Table I below are those required to peel the test labels from the sample backing strips and were measured immediately (initial) under room temperature conditions and immediately under Kiel conditions (140° C.).

In Table I below, a release of greater than 500 grams per two inches indicates that the release of the test label was so tight that the measured value was off the scale and the load cell shorted out.

TABLE I

INITIAL LABEL RELEASE VALUES (grams per 2 inch width)

| | MANUFACTURING CONDITIONS | | | | | | RELEASE ROOM TEMP | | RELEASE KIEL CONDITIONS (140° C.) | |
|---|---|---|---|---|---|---|---|---|---|---|
| Experiment | line speed (fpm) | laminated | secondary unwind | corona treat .5 watt | primer dryer 275° F. | bleach Kraft Paper (wt.) | idler roll locked | mean | stnd. dev. | mean | stnd. dev. |
| Control 1 | 500 | no | | | | | | 54.1 | 1.1 | 57 | 5.7 |
| Control 2 | 500 | no | | X | | | | >500 | N/A | >500 | N/A |
| Control 3 | 20 | no | | | X | | | 55.1 | 3.4 | 71.9 | 6.7 |
| Control 4 | 500 | no | | | | | X | 58.3 | 2.5 | 59.9 | 1.2 |
| Example 1 | 500 | yes | | | | #20 | | 90.9 | 3.2 | 91 | 7.5 |
| Example 2 | 500 | yes | X | | | #40 | | 174.5 | 23.5 | 157.1 | 4.8 |
| Comparison 1 | 500 | yes | | X | | #20 | | >500 | N/A | >500 | N/A |

Next, more samples of Controls 1–4, Examples 1 and 2, and Comparison 1 were tested after one week aging under room temperature conditions, and after one week aging under Kiel conditions. The results of the release force tests after the one-week aging are shown in Table II below. In Table II, WELD means that after the test label was applied to the release surface of the sample, it was not separable from the release surface. Also, a release of greater than 500 grams per two inches indicates that the release of the test tape was so tight that the measured value was off the scale and the load cell shorted out. As in Table I, release values in Table II were measured per two inch width with a TLMI release tester operating at a pull rate of 400 inches per minute.

adequately wet-out on the PET film thus obviating the need for a corona discharge treatment and eliminating the risk of silicone-coating destruction as demonstrated by Examples 1 and 2.

As can be seen from the release of Control 3 in Tables I and II, the preheating at 275° F. had very little effect on release. It was also observed that preheating decreased

TABLE II

LABEL RELEASE VALUES AFTER ONE-WEEK AGING (grams per 2 inch width)

| | MANUFACTURING CONDITIONS | | | | | | | RELEASE ROOM TEMP | | RELEASE KIEL CONDITIONS (140° C.) | |
|---|---|---|---|---|---|---|---|---|---|---|---|
| Experiment | line speed (fpm) | laminated | secondary unwind | corona treat .5 watt | primer dryer 275° F. | bleach Kraft Paper (wt.) | idler roll locked | mean | stnd. dev. | mean | stnd. dev. |
| Control 1 | 500 | no | | | | | | 53.1 | 1.1 | 51.7 | 1.0 |
| Control 2 | 500 | no | | X | | | | WELD | N/A | WELD | N/A |
| Control 3 | 20 | no | | | X | | | 53.7 | 2.1 | 54 | 1.7 |
| Control 4 | 500 | no | | | | | X | 55.3 | 1.5 | 53.5 | 1.3 |
| Example 1 | 500 | yes | | | | #20 | | 87.2 | 6.1 | 87.9 | 4.3 |
| Example 2 | 500 | yes | X | | | #40 | | 141.9 | 5.3 | 139.8 | 9.5 |
| Comparison 1 | 500 | yes | | X | | #20 | | >500 | N/A | WELD | N/A |

For the two inch wide tape used to achieve the release force results in Tables I and II, release values of under 200 grams per two inch width are acceptable for release backing applications. Good release is found with release values of less than 160 grams per two inch width. Release values of less than 120 grams per two inches are preferred and values of less than 100 grams per two inches are even more preferred. These values are applicable to initial and one week aged samples at room temperature and under Kiel conditions.

As can be seen from Tables I and II, the inventive laminates of Examples 1 and 2 exhibited acceptable and preferred release force values indicating that the exemplary embodiments tested would make excellent release backings and liners, particularly for pressure sensitive adhesive labels. The laminated structures offer excellent release values while at the same time providing printability, excellent tear resistance, stiffness and moisture barrier properties. It is believed that the stiffer 40 pound per ream paper used in Example 2 was the major cause for the higher release force as compared to the release force obtained in Example 1 where thinner 20 pound per ream paper was employed. It is further believed that the secondary unwind position of the film had little or no affect on the release of Example 2.

Control 2 and Comparison 1 were the only experiments shown in Tables I and II wherein the surface of the PET layer was corona discharge treated opposite the silicone-coated surface. As can be seen in Tables I and II, the release properties of Control 2 and Comparison 1 were unacceptable in that their release force is greater than 500 gms per two inch width or the silicone-coated surface welded to the test tape. The corona treatment affected the release properties of the silicone-coated surface such that the laminated backing structure was extremely difficult to separate or inseparable from the applied adhesive test label. The corona treatment, even at just 0.5 watt per square foot per minute, substantially deleteriously affected the silicone coating on the opposite surface of the PET film and thus adversely affected the release properties of the release surface. Hot melt adhesives surface smoothness due to heat distortion and wrinkling of the polymeric film.

The results of Control 4 in Tables I and II show that release from the silicone-coated surface was not substantially affected by passing the surface over a locked-up idler roller. No substantial destruction of the silicone coating occurred, as evidenced by the excellent release values. The silicone coating acts as a lubricant to enable smooth gliding of the coated polymeric film over the locked roller, without substantially rubbing off or otherwise destroying the coating. Thus, the results indicate that the processes of the present invention may be performed on conventional paper mills without substantially adversely affecting label release.

EXAMPLES 3 AND 4, CONTROLS 5–8, AND COMPARISON 2

Examples 3 and 4 involved testing the force required to release a one-inch wide adhesive test tape at a slow speed from the laminated structures of the present invention, and the effects various process conditions have on release of the test tape. The manufacturing conditions and results are reported in Table III below. The backing materials for Controls 5–8 were the same as the backing materials for Controls 1–4, respectively. The backing materials for Examples 3 and 4 were the same as the backing materials for Examples 1 and 2, respectively. The backing material for Comparison 2 was the same as the backing material for Comparison 1. However, for each of Controls 5–8, Examples 3 and 4, and Comparison 2, the release forces shown in Table III were determined with an Instron measuring device designated Model TM, serial no. 2335, using a 1 inch wide TESA 7475 adhesive release test tape. Also, a pull rate of 12 inches per minute instead of 400 inches per minute was employed. Such low speed release rates approximate a manual peel of a label from a release backing. The Instron measurements were made within about 20 minutes of production of the backing material (off-machine) and under initial Kiel conditions.

TABLE III

INITIAL LABEL RELEASE VALUES (grams per one inch width)

| | MANUFACTURING CONDITIONS | | | | | | RELEASE OFF-MACHINE | | RELEASE KIEL CONDITIONS (140° C.) | |
|---|---|---|---|---|---|---|---|---|---|---|
| Experiment | line speed (fpm) | laminated | secondary unwind | corona treat .5 watt | primer dryer 275° F. | bleach Kraft Paper (wt.) | idler roll locked | mean | stnd. dev. | mean | stnd. dev. |
| Control 5 | 500 | no | | | | | | 11.8 | 0.5 | 94.1 | 2.4 |
| Control 6 | 500 | no | | X | | | | 84.4 | 18.8 | 490.1 | 1.3 |
| Control 7 | 20 | no | | | X | | | 14.0 | 1.0 | 95.7 | 2.8 |
| Control 8 | 500 | no | | | | | X | 14.7 | 0.8 | 43.7 | 10.1 |
| Example 3 | 500 | yes | | | | #20 | | 15.0 | 2.4 | 44.4 | 13.1 |
| Example 4 | 500 | yes | X | | | #40 | | 15.9 | 0.8 | 41.8 | 12.3 |
| Comparison 2 | 500 | yes | | X | | #20 | | 34.0 | 6.1 | 443.4 | 35.8 |

When release testing is conducted with a one inch wide TESA 7475 test tape, initial release values of less than 20 grams per inch are preferred for room temperature samples and values of less than 50 grams per inch are preferred for samples tested under Kiel conditions. More preferable release values under Kiel conditions are values less than 45 grams per inch.

The results of Control 6 and Comparison 2 indicate that a pre-lamination corona treatment of as little as 0.5 watt per square foot per minute adversely affects the silicone coating opposite the treated 48 gauge PET surface, but release remains possible with the one-inch wide TESA test tape.

It was observed that although a very minor amount of heat shrinkage occurred in the experimental samples tested under Kiel conditions and shown in Table III, only Control 7 which involved a preheat step exhibited a heat-distorted film surface.

Control 6 in Table III was also tested after a 24 hour ambient aging of the sample. The mean release force after 24-hour aging was reduced to 44.9 grams per inch from an initial value of 84.4 grams per inch for the same control. The standard deviation from the 24-hour aging mean value was 6.9.

The foregoing results for Examples 1–4 demonstrate that the use of a hot melt adhesive in combination with a chill roll provides advantageous results when laminating a silicone-coated polymeric layer to a cellulosic layer. The combination provides an integrally laminated structure having a low surface energy release surface without the need for a corona discharge treatment to effect a uniform wet-out of the laminating adhesive. Without the need for a corona treatment of the laminating polymeric surface prior to lamination, destruction of the silicone coating opposite the laminating surface is avoided.

As can be seen from the Tables above, Examples 1–4 showed excellent release values in a thin, inexpensive, in-line laminated structure. The release properties of the laminates of Examples 1–4 demonstrate that they are excellent for release liner, release backing, and other non-stick low surface energy applications.

Water-based adhesives could also be used as a laminating adhesive but corona treatment to improve adhesive wet-out on the PET film laminating surface should be conducted at a low level, for example up to about 0.2 watt per square foot per minute for a 48 gauge silicone-coated PET film, to improve wettability of the aqueous adhesive without deleteriously affecting the silicone coating opposite the corona-treated surface.

What is claimed is:

1. A multi-layered sheet product with a thickness of up to about 1.5 mils, comprising:
   a self-supporting polymeric material layer having a first surface and an opposite second surface, said first surface having a substantially uniform silicone coating formed thereon;
   an adhesive; and
   a cellulosic material layer,
   wherein said adhesive is disposed between said second surface of said polymeric material layer and said cellulosic material layer and adheres said polymeric and cellulosic material layers together.

2. The multi-layered sheet product of claim 1, wherein said polymeric material layer comprises a polyester.

3. The multi-layered sheet product of claim 1, wherein said polymeric material layer comprises oriented polyethylene terephthalate.

4. The multi-layered sheet product of claim 1, wherein said cellulosic material layer comprises one member selected from the group consisting of tissue paper, kraft paper and paper board stock.

5. The multi-layered sheet product of claim 1, wherein said adhesive comprises at least one member selected from the group consisting of hot melt adhesives, solvent adhesives, emulsion adhesives, and wet lamination adhesives.

6. The multi-layered sheet product of claim 1, wherein said adhesive comprises low density polyethylene.

7. The multi-layered sheet product of claim 1, wherein said polymeric material layer has a thickness of from about 0.25 mils to about 1.5 mils.

8. The multi-layered sheet product of claim 1, wherein said adhesive is a water-based adhesive and said second surface of said polymeric material layer is surface treated prior to contacting said adhesive layer to improve adhesion of said polymeric material layer to said cellulosic material layer.

9. The multi-layered sheet product of claim 8, wherein said second surface of said polymeric material layer is corona discharge treated at a rate which does not substantially affect release properties of said silicone coating.

10. The multi-layered sheet product of claim 1, further including a label having an adhesive on one side thereof, wherein said adhesive of said label is in contact with said silicone coating on said polymeric material layer and said silicone coating functions as a release surface for said adhesive of said label.

11. The multi-layered sheet product of claim 10, wherein said label is substantially transparent.

12. The multi-layered sheet product of claim 10, wherein said adhesive of said label is a pressure sensitive adhesive.

13. The multi-layered sheet product of claim 1, wherein said silicone coating has a thickness of from about 750 angstroms to about 1500 angstroms.

14. The multi-layered sheet product of claim 1, wherein said adhesive is a hot melt adhesive.

15. The multi-layered sheet product of claim 1, wherein said adhesive melts at a temperature below a glass transition temperature of said polymeric material layer.

16. The multi-layered sheet product of claim 1, wherein said adhesive layer is substantially clear.

17. The multi-layered sheet product of claim 1, wherein said silicone coating includes a glycidoxy silane.

18. The multi-layered sheet product of claim 17, wherein said glycidoxy silane is present at about 3 to about 30 weight percent of said silicone coating on a dry weight basis.

19. The multi-layered sheet product of claim 1, wherein said silicone coating is present at about 0.02 lb/ream to about 0.10 lb/ream.

20. The multi-layered sheet product of claim 1, wherein said adhesive is present at about 7 lb/ream to about 14 lb/ream.

21. The multi-layered sheet product of claim 1, wherein said adhesive is substantially free of water and solvent.

22. A multi-layered label backing sheet product with a thickness of up to about 1.5 mils, comprising:
- a self-supporting polyester material layer having a first surface and an opposite second surface, said first surface having a substantially uniform silicone release coating formed thereon;
- a hot melt adhesive; and
- a cellulosic material layer, wherein said adhesive is disposed between said second surface of said polyester material layer and said cellulosic material layer and adheres said polyester and cellulosic material layers together, said multi-layered label backing sheet having a thickness of up to about 1.5 mils.

* * * * *